United States Patent [19]

Utsuda et al.

[11] Patent Number: 4,769,696
[45] Date of Patent: Sep. 6, 1988

[54] SCANNER SET-UP SIMULATION APPARATUS

[75] Inventors: Tetsuji Utsuda, Kawagoe; Taketo Sato, Tokorozawa; Takeo Onga, Saitama; Hideo Sugimoto, Tokyo; Yasuo Oki, Tokyo; Tuyoshi Suwa, Tokyo, all of Japan

[73] Assignee: Toppan Printing Co., Ltd., Tokyo, Japan

[21] Appl. No.: 44,205

[22] Filed: Apr. 30, 1987

[30] Foreign Application Priority Data

May 1, 1986 [JP] Japan .................. 61-101417
May 1, 1986 [JP] Japan .................. 61-101418
May 1, 1986 [JP] Japan .................. 61-101419

[51] Int. Cl.$^4$ .................................. H04N 1/46
[52] U.S. Cl. .......................... 358/80; 358/75
[58] Field of Search ................. 358/80, 75, 76

[56] References Cited

U.S. PATENT DOCUMENTS

| | | | |
|---|---|---|---|
| 3,972,066 | 7/1976 | Seki et al. ............... | 358/76 |
| 4,032,969 | 6/1977 | ueda ....................... | 358/80 |
| 4,136,360 | 1/1979 | Hoffrichter et al. .... | 358/80 |
| 4,250,522 | 2/1981 | Seki et al. ............... | 358/76 |
| 4,255,761 | 3/1981 | Knop et al. ............. | 358/80 |
| 4,403,249 | 9/1983 | Knop et al. ............. | 358/80 |
| 4,561,016 | 12/1985 | Jung et al. ............ | 358/80 X |
| 4,631,578 | 12/1986 | Sasaki et al. .......... | 358/80 |
| 4,639,770 | 1/1987 | Jung et al. ............ | 358/80 X |
| 4,692,796 | 9/1987 | Yamada et al. ........ | 358/76 |

FOREIGN PATENT DOCUMENTS

| | | |
|---|---|---|
| 2607623 | 9/1977 | Fed. Rep. of Germany . |
| 49-40819 | 4/1974 | Japan . |
| 52-125001 | 10/1977 | Japan . |
| 59-822 | 1/1984 | Japan . |
| 60-037559 | 2/1985 | Japan .................. 358/80 |
| 60-216350 | 10/1985 | Japan .................. 358/80 |

Primary Examiner—James J. Groody
Assistant Examiner—E. Anne Faris
Attorney, Agent, or Firm—Bacon & Thomas

[57] ABSTRACT

A scanner set-up simulation unit is connected to a color scanner which comprises a reading head for reading an image information of the color original wound on a reading drum and for producing color separation signals, a first gradation correction circuit for correcting a gradation of the color separation signals, and an exposure head for exposing color separation films wound on a recording drum based on the corrected color separation signals output from the first gradation correcting circuit. The simulation unit comprises a level adjusting circuit for adjusting the white and black levels of the color separation signals, an IC memory for storing the color separation signals from the level adjusting circuit, a second gradation correction circuit for correcting a gradation of the color separation signals read out from the IC memory, and a color display for simulating and displaying a printed reproduction based on the corrected color separation signals from the second correcting means. After the gradation correction is ended, the corrected color separation signals from the second correcting means are supplied to the exposure head of the color scanner.

13 Claims, 10 Drawing Sheets

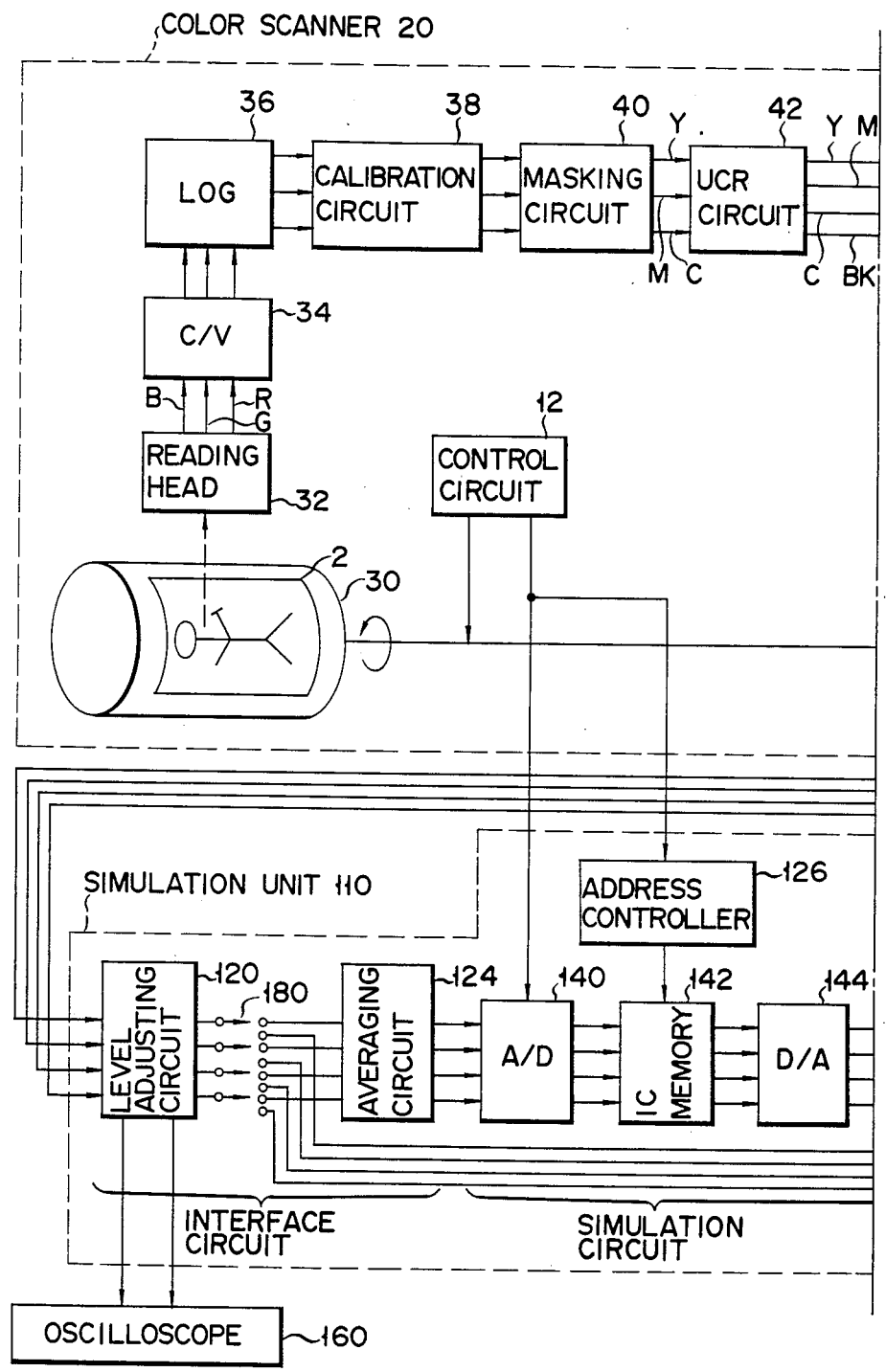
F I G. 2A

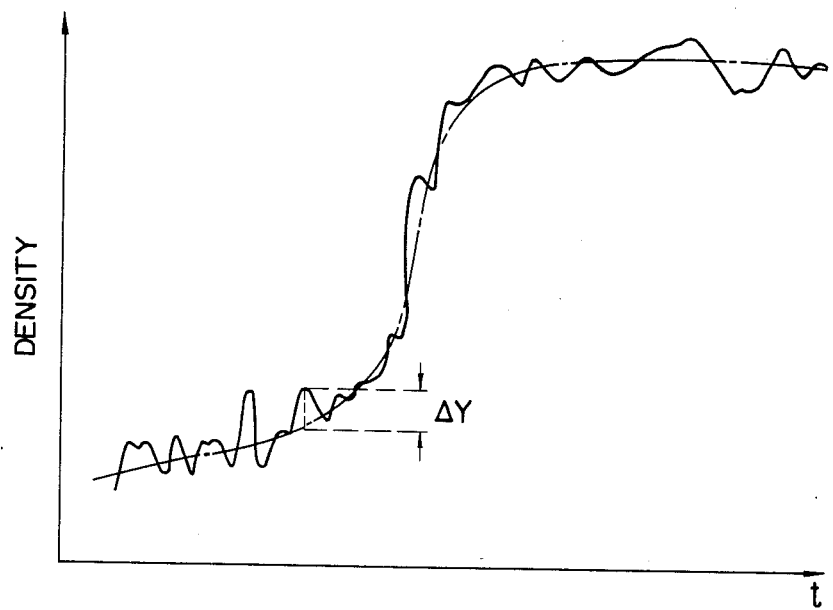
F I G. 3
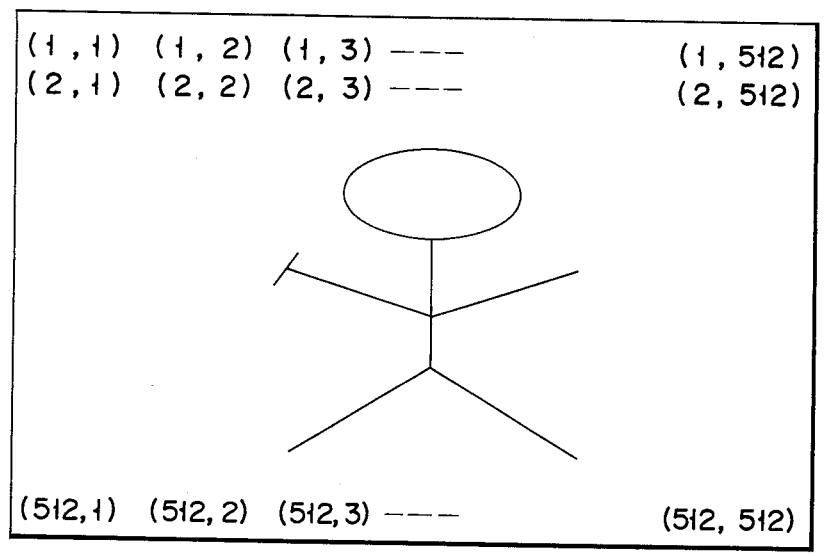
F I G. 4

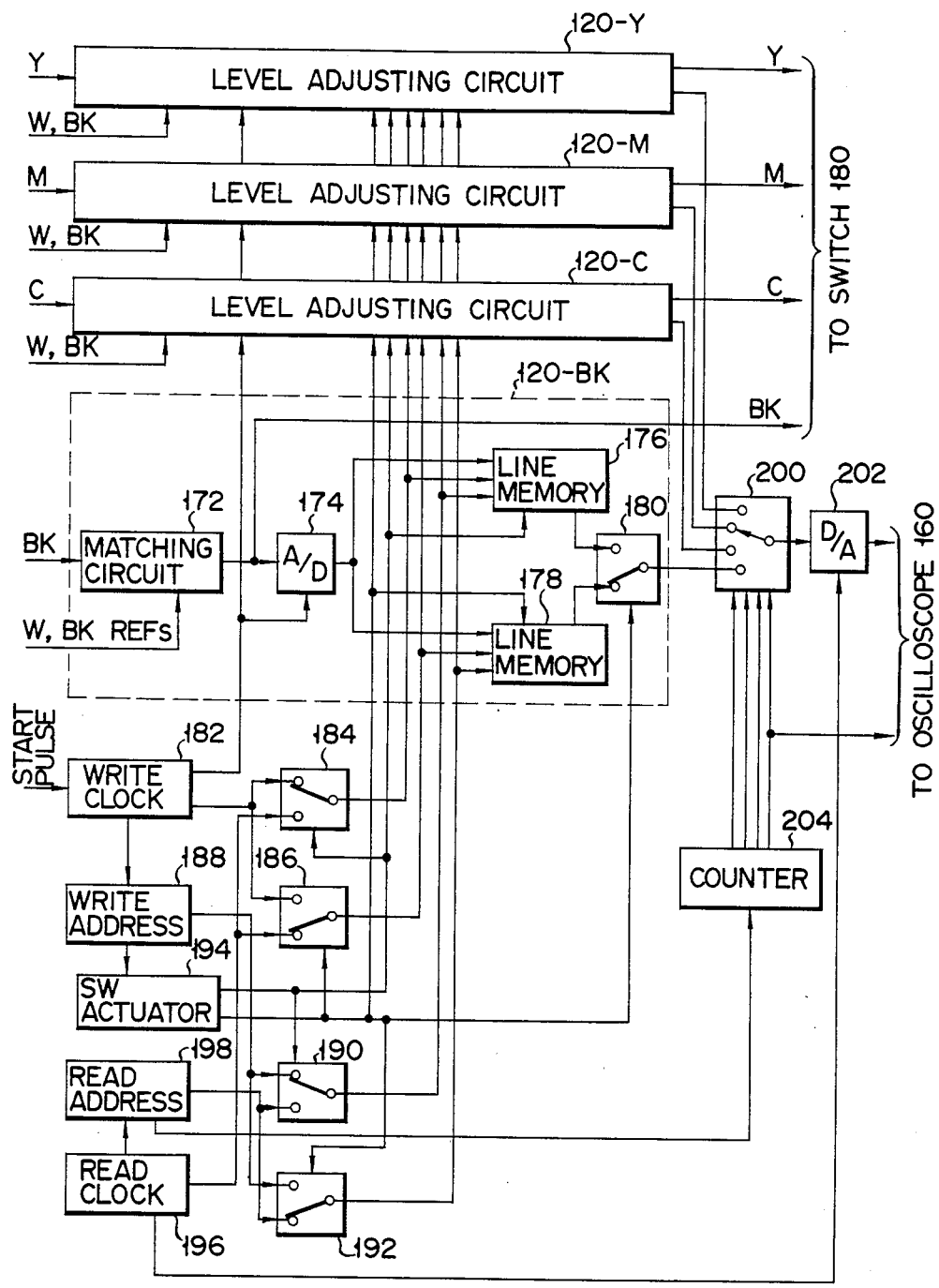
F I G. 5

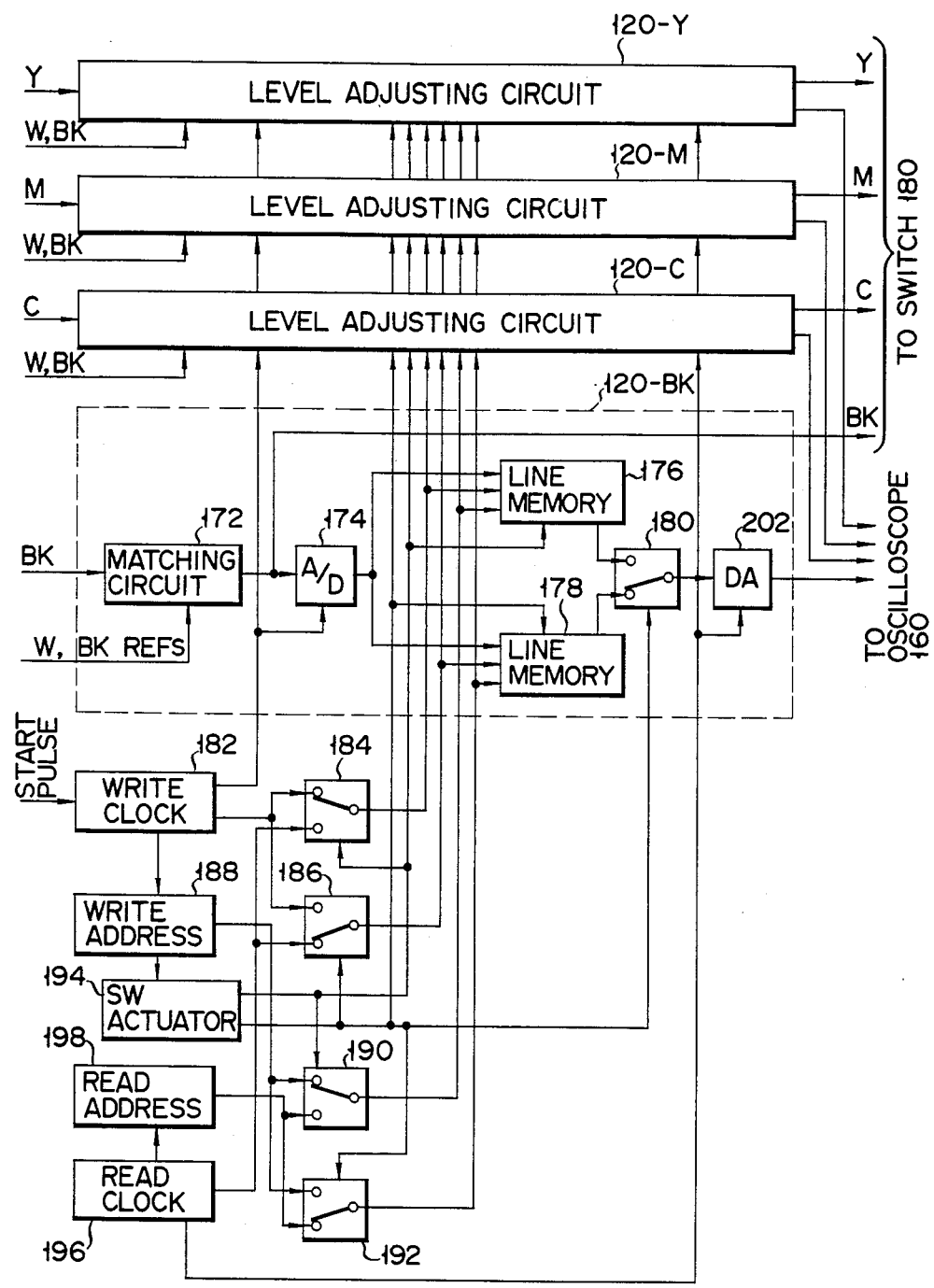
F I G. 7

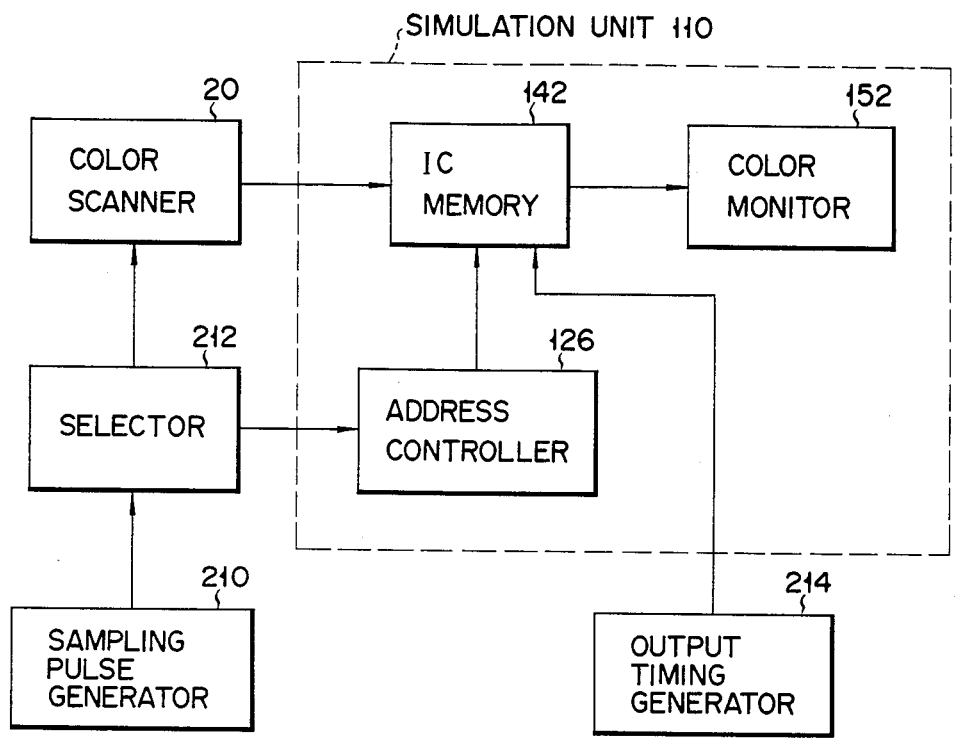
F I G. 8
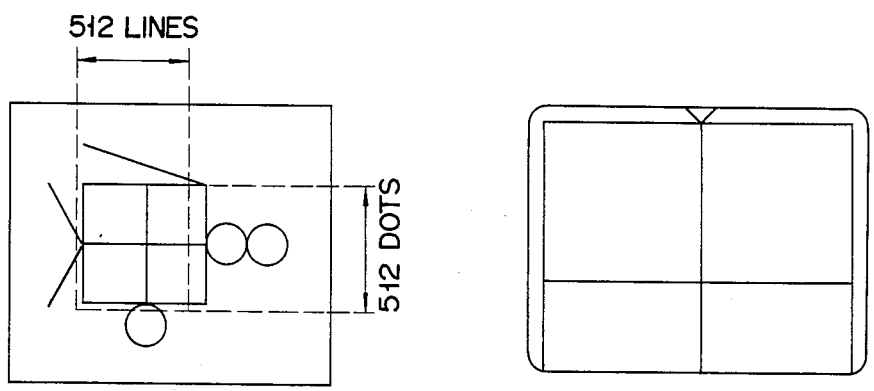
F I G. 9A    F I G. 9B

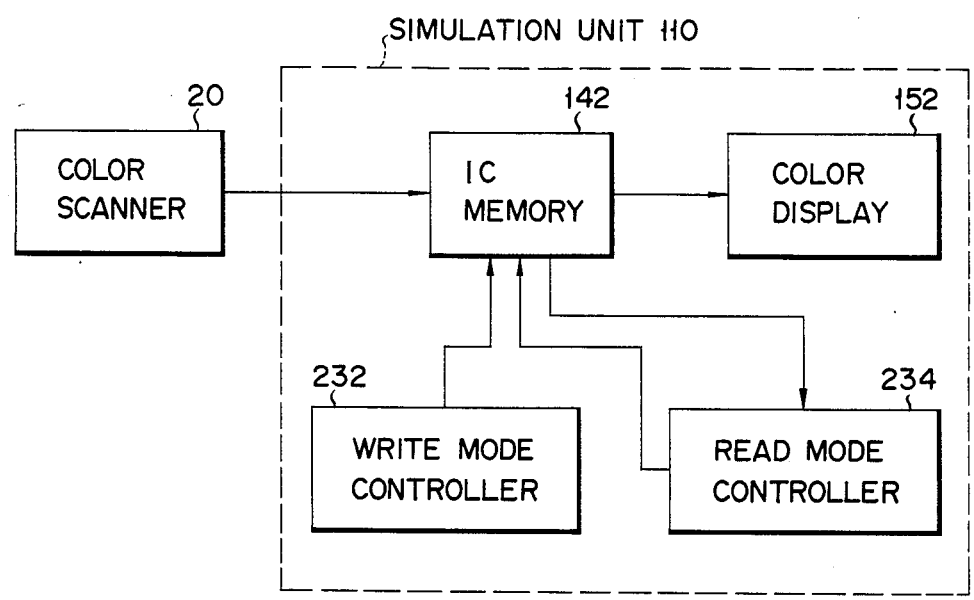
F I G. 12

SCANNER SET-UP SIMULATION APPARATUS

BACKGROUND OF THE INVENTION

This invention relates to a scanner set-up simulation apparatus for adjusting or checking the color separation conditions of a color scanner, by simulating a printed matter on a color monitor screen on the basis of the color component signals, which are obtained by color separating a color original.

A flow of color printing work will be briefed below. A color original is scanned by a color scanner, and a color separation film is made. A proof printing plate is made from the color separation films. The proof printing plate is set to a proof printing machine, and the proof printing is performed. If the color tone of the proof is unsatisfactory, the set-ups of the color scanner is changed and the color separation process is executed again, and the proof printing is made also again. If the color tone of the printed matter is satisfactory, a press plate is made using the color separation films, and is set to a printing machine for printing.

Such a proof printing process takes much time, cost and labor. To cope with this, many types of scanner set-up simulation apparatuses with color monitors have been developed. This type of simulation apparatus electronically executes the proof printing process in the color printing work, and of course eliminates the need for the proof printing. In the simulation apparatus, a final reproduction is displayed on the color monitor screen. An operator visually checks the monitor image, and sets desirable color separation conditions.

There are some prior arts of the scanner set-up simulation apparatus, such as U.S. Pat. No. 3,972,066 disclosing the plate checking apparatus, and U.S. Pat. No. 4,240,522 disclosing the color separation condition determining apparatus. In these prior arts, the simulation apparatus is provided separately from the color scanner. Another prior art is Japanese Patent Disclosure (KOKAI) No. 49-40819. In this prior art, the simulator is assembled into the color scanner. A further prior art is Japanese Patent Disclosure (KOKAI) No. 52-125001. This prior art partially couples the color scanner with the simulator.

The above prior arts involve some common problems. Firstly, it is very difficult to couple the simulator with various types of existing color scanners. Secondly, the simulator makes use of only some part of information collected by the color scanner. The displayed image depends largely on the image information as formed by the simulation technique, and therefore its quality is unsatisfactory, with poor resemblance. Thus, the prior arts are lack of the following essential requirements for the simulation apparatus; to use less simulation information for displaying the final reproduction, in connection with ensuring a high picture quality, and to simulate not only the color but also the image at a high speed, in connection with improvement of the workability.

Generally, the color original includes much finer density data than those of the color monitor image. The image signal obtained by scanning the color original contains fine gradation density data, since the scanner has a high reading accuracy, and a high resolution. In the succeeding electronical processing of the scanned image data, e.g. in storing the image data into a memory prior to its display by the color monitor, the image data of one image are coarsely sampled and stored in the form of 512×512 picture elements at most, because of the limited memory capacity of the memory. Therefore, in storing the image data into the memory, the average density of the sampled image may be offset from the average density of the color original depending on the sampling points.

In the case of the simulation apparatus used coupled with a separate color scanner, for making the color separation films the color separation conditions must manually be set to the scanner. Such a manual setting operation for color separation conditions are troublesome work and leads possibly to mistaken setting of the color separation conditions.

In some simulation apparatuses of the type in which the color component signals from the scanner are directly input to the simulation unit for the simulation of the printed matter, the voltage level of the color separation signal treated in the color scanner is different from that in the simulation unit, which composes the color separation signals and visually displays the composite one on the screen of the color monitor. For example, the signal level of the color scanner is 0 to 10 V, and that of the simulation unit is 0.7 Vp-p, equal to the usual video signal. For inputting the color component signals from the color scanner into the simulation unit, a level adjust circuit must be provided for level matching the image signal level and the DC level of the scanner with those of the simulation unit.

In a specific example to level matching, a gray scale is set on the drum surface of the color scanner. The drum is manually rotated to successively find the density indication places on the gray scale. Then, these places are irradiated with a beam spot. The reading head reads in or picks up the densities at these places. The density signal derived from the reading head is input to the level adjust circuit for level adjusting. Thus, to level adjust, the drum is rotated for each density place, and the level adjustment is made at each place. The sequence of drum rotation, beam spot irradiation, and density reading must be conducted for each color component. This is troublesome and time consuming work.

To cope with this problem, there is an approach in which the color component signals to be input to the simulation unit, are also input to an oscilloscope for level adjustment. The rotating speed of the drum of the color scanner is 10 to 20 turns per second, very slow. If the color component signals are directly input to the oscilloscope, the sweep frequency of the image signal waveform is very low. This indicates that observation of the image signal waveform by the oscilloscope and the signal level adjustment based on the observation are almost impossible from a practical viewpoint.

The simulation apparatus of this type involves an additional problem that the format of the output signal from the color scanner is not uniform for different types of color scanners. The color scanner has a rotating drum and a photo-electric head. A color original is optically and two dimensionally scanned by the head. The original (film) is set onto the drum surface. The head is shifted by a predetermined pitch in the axial direction of the drum for each rotation the drum. One scanning line signal is obtained for each turn of the drum. Each scanning line obtained is sampled by the sampling pulse, and subjected to the A/D conversion, and finally stored into the memory in the simulation unit.

The number of scanning lines and the number of samplings for each scanning line are determined by the number of picture elements of the memory. If the number of picture elements of the memory is 512×512, the shift pitch of the head is set to the segmental length obtained when the axial length of the color separation area in the originally wound on the drum surface is equally divided by 512. The period of the sampling pulse corresponds to the segmental value obtained when the circumferential length of the color separation area of the original is equally divided into 512 segments. The aspect ratio of the color monitor frame is 3:4, not 1:1. Therefore, the ratio of width to height of the color separation area is also set to 3:4.

This is diagrammatically illustrated in FIGS. 1A to 1D. FIG. 1A shows a color separation area (a rectangular area surrounded by a broken line) of the color scanner when a rectangular original is set around the drum. In the figure, the vertical direction coincides with the circumferential direction of the drum, and the width direction coincides with the axial direction of the drum. As seen, the ratio of height to width of the color separation area is 3:4. If the image data is read out from the memory, and used for display, the color monitor displays an image of the aspect ratio 3:4, as shown in FIG. 1B.

To rotate the image 90° with the inversed aspect ratio, it is enough to read out the data from memory by interchanging the row and column addresses. In this case, if all of the data in the memory are read out and displayed, the image displayed by the monitor has the aspect ratio of 4:3, as shown in FIG. 1C, and a nondisplay area appears on the screen, as indicated by slanted lines. To eliminate the nondisplay area, the image must be expanded as shown in FIG. 1D. The width of the image in FIG. 1C contains the scanning lines $512 \times (\frac{3}{4})^2$. To expand this up to 512 scanning lines, the scanning line signal must be interpolated.

As described above, in the prior simulation apparatus, to rotate the display image by 90°, the row and column of the address signal are interchanged when reading out the image data from the memory. To display the image on the entire screen of the color monitor whose the aspect ratio is other than 1:1, the interpolation processing for expanding the image is essential. To realize this, a complicated circuit construction and much time for interpolation processing as well are needed.

Further, the resolution of the color scanner is different from that of the color monitor. The color scanner produces the image signal at high resolution, e.g. 150 lines/inch. The resolution of the color monitor is not so high. Usually, in the color scanner, the circumferential direction (height) of the drum is the main scanning direction, while in the color monitor, the horizontal direction (width) is the main scanning direction. Since the color monitor has 512 lines for the resolution in the height direction, to read the original of 10 inches length (axial direction), 1500 scanning lines are generated. However, the resolution of the image signal to be input from the color scanner to the simulation unit is only about 50 lines per inch, approximately ⅓ of that 1500 lines.

In the conventional color scanner, even if its head shift amount is set variable, its variable range is not so much. To transfer the image signal from the color scanner to the simulation unit, the image signal information by scanning lines must be thinned out. To this end, the circuitry including a line counter is provided.

Thus, in the conventional simulation apparatus, the sampling processing must be applied for the image signal information in the simulation unit. Therefore, the circuitry including the line counter is additionally needed. Further, the color scanner reads in the unnecessary scanning lines including those to be dropped (not sampled) later. This is wasteful particularly in time.

To display the image data stored in the memory by the display device in different modes such as a normal mode and a rotation mode, the conventional device writes the data in the specific mode. In the image reproduction, it specifies again the mode as specified when it is written, and reads out the data according to the specified data. In this way, the read out mode is selected.

In the image reproduction, therefore, to display the image data in the mode as specified when the data is written, the mode of normal or rotation as specified when the data is written, is specified again, and the read out mode is selected by a read out mode selector. Thus, the read out mode selector is additionally used. The mode designation work is needed for both the data writing and data reading.

SUMMARY OF THE INVENTION

Accordingly, it is an object of this invention to provide a scanner set-up simulation apparatus which is easy to connect the general type of color scanner and can use the whole color separation signal information for simulating the final reproduction, thereby simulating not only the color but also the image at a high speed and improving the workability.

Another object of this invention is to provide a scanner set-up simulation apparatus which eliminates the manual setting operation of the color separation conditions to the color scanner after the set-ups of the color scanner are adjusted.

Still another object of this invention is to provide a scanner set-up simulation apparatus which is connected to an oscilloscope for monitoring the waveform of the output signal from the color scanner, thereby adjusting the signal level from the color scanner.

Further object of this invention is to provide a scanner set-up simulation apparatus which displays the final reproduction in a desired rotated manner without an additional circuit such as an interpolation circuit and a mode selector.

Still further object of this invention is to provide a scanner set-up simulation apparatus which is easy to connect the color scanner of various types producing the color separation signals of various formats.

According to this invention, there is provided a scanner set-up simulation apparatus, which is connected to a color scanner for color-separating a color original and for forming color separation films in a color printing, comprising:

means for receiving color separation signals from the color scanner, the color separation signals being input to a color separation film exposing section of the color scanner;

means for storing the received color separation signals;

means for correcting the color separation signals output from said storing means, said means including at least gradation correction means; and means for simulating and displaying a color print based on the corrected color separation signals.

BRIEF DESCRIPTION OF DRAWINGS

FIG. 2 and FIGS. 2A and 2B show a block diagram illustrating a first embodiment of a scanner set-up simulation apparatus according to this invention;

FIG. 3 shows the density of the image signal input to the scanner set-up simulation apparatus of the first embodiment;

FIG. 4 diagrammatically shows the writing/reading operation of the IC memory in the scanner set-up simulation apparatus of the first embodiment;

FIG. 5 is a block diagram illustrating a level adjusting circuit of a second embodiment of a scanner set-up simulation apparatus according to this invention;

FIG. 7 is a block diagram illustrating a level adjusting circuit of a third embodiment of a scanner set-up simulation apparatus according to this invention;

FIG. 8 is a block diagram illustrating a fourth embodiment of a scanner set-up simulation apparatus according to this invention;

FIGS. 9A and 9B diagrammatically show the writing/reading operation of the IC memory in the scanner set-up simulation apparatus of the fourth embodiment;

FIG. 12 is a block diagram illustrating a sixth embodiment of a scanner set-up simulation apparatus according to this invention.

DETAILED DESCRIPTION OF THE PREFERRED EMBODIMENTS

Figure 2:
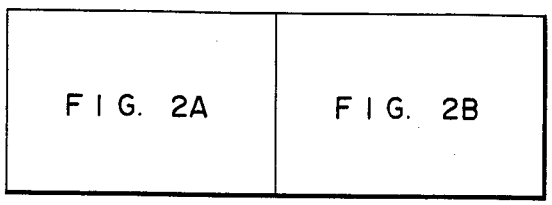

An embodiment of a scanner set-up simulation apparatus according to the present invention will be described, referring to the accompanying drawings. FIG. 2 is a block diagram illustrating a first embodiment of this invention. Simulation unit 110 is connected to color scanner 20. Various types of conventional color scanners are available for the color scanner 20. In this embodiment, a known so-called direct scanner (SG818, Dainippon Screen Seizou Co., Ltd.) is used. The simulation circuit section in simulation unit 110, which includes A/D converter 140, IC memory 142, D/A converter 144, gradation correction circuit 146, color correction circuit 148, matrix circuit 150, and color monitor 152, have almost the same functions as the corresponding section in the apparatus as disclosed in U.S. Pat. No. 3,972,066.

Color original 2 mounted on reading drum 30 is optically scanned with the rotation of reading drum 30 and the shift of reading head 32. The beam splitter, filters of red (R), green (G) and blue (B), and the photo-electric cell, and so on, all contained in reading head 32, cooperate to produce B, G and R image signals.

The obtained R, G and B image signals are current-/voltage converted by current/voltage (C/V) converter 34. The C/D converted signal is logarithmically converted by LOG converter 36. The converted signal is then level-adjusted by calibration circuit 38.

Masking circuit 40, under-color removal circuit 42, and gradation correction circuit 44 cooperate to form a so-called color calculating circuit for color correction for printing. Masking circuit 40 performs so-called masking correction. Under-color removal circuit 42 converts Y, M and C signals into Y, M, C and BK signals, so as to make the printing in primary four colors in printing, yellow (Y), magenta (M), cyan (C), and black (BK). Gradation correction circuit 44 performs gradation correction such as compression, highlight, shadow, contrast and pedestal correction.

By appropriately controlling the correction circuits, the image to be printed will have satisfactory tones.

After the color correction by the color calculating circuit, the Y, M, C, and BK image signals are passed through inverse-logarithmic converter 50, where these are returned to the original states. Channel selector 52 determines which signal among these four signals is recorded in color separation film 6 on exposure drum 70. Then, the image signals are analog/digital converted by A/D converter 60. The converted image signals are converted into dot signals by dot generator 62. Additionally, it is applied with the information relating to a magnification of color separation film 6 to color original 2. Exposure head 66 exposes film 6 on exposure drum 70 in accordance with the image signals magnification controlled. This film 6 is developed, so that a half-tone color separation film is made. In the drawing, only one separation film is illustrated. Actually, however, a total of four separation films are used for respective colors. Switch 186 is connected between channel selector 52 and A/D converter 60. Switch 186 selects the connection of the output of channel selector 52 or the output of simulation unit 110 to A/D converter 60.

Y, M, C and BK image signals 5, after being passed through the color calculating circuit of color scanner 20 (in this embodiment, the output image signals of channel selector 52), are supplied to simulation unit 110. Control circuit 12 controls every operation of color scanner 20. Control circuits 12 generates various control signals and it sends a scanning timing signal for color original 2 to simulation unit 110 (A/D converter 140 and address controller 126).

Simulation unit 110 comprises an interface circuit section, a simulation circuit section, address controller 126, and level adjusting circuit 192. The interface circuit section includes level adjusting circuit 120 and averaging circuit 124. The simulation circuit section includes A/D converter 140, IC memory 142 D/A converter 144, gradation correction circuit 146, curve correction circuit 147, color correction circuit 148, matrix circuit 150, and color monitor 152.

Level adjusting circuit 120 converts the voltage level of the image signals, which is output from color scanner 20, into that of the image signals processed in simulation unit 110. In color scanner 20 of this embodiment, the image signal is treated in the TTL level (0 to 5 V). In simulation unit 110, the voltage level of the image signal is 0.7 Vp-p of the usual video signal. It is for this reason that the level adjustment is needed between color scanner 20 and simulation unit 110.

Level adjusting circuit 120 is connected to oscilloscope 160. Oscilloscope 160 is used for observing the waveform of the input signals in order to match the signal levels of color scanner 20 with those of simulation unit 110.

Switch 180 is connected between level adjusting circuit 120 and averaging circuit 124. Switch 180 makes selection as to whether the outputs of level adjusting circuit 120 are supplied to averaging circuit 124, or bypassed the circuit section from averaging circuit 124 to switch 182.

In this embodiment, averaging circuit 124 is a kind of low-pass filter. Circuit 124 averages the input image signals to smooth the signal waveform into a relatively gentle waveform. Use of this filter eliminates the drawback caused by the incorrect sampling. Generally, the image on color original 2 has much finer gradation density data than the image reproduced by color monitor 152. The image signals are stored into IC memory 142, in order to visually displaying them on the color monitor 152. In this case, because of the limited memory capacity of the memory, the image signals of one image are very coarsely sampled and stored in the density of 512×512 picture elements. Specifically, the image signals are sampled and stored, with equal division of one scanning line into 512 segments.

The density data of the image signal has fine gradation levels, as shown in FIG. 3. When such density data is sampled, the sampled density may have an offset $\Delta Y$ from the average density indicated by one dot chain line, depending on the sampling point. To avoid such incorrect sampling, the image signal is averaged in some degree into a gentle curve, as indicated by one-dot-chain line, before sampling. For smoothing the image signal by averaging circuit 124, it is preferable to use a low-pass filter. In this case, if the number of rotation of reading drum 30 is fixed and almost the whole color original 2 is picked up as one one image, the cutoff frequency of the filter should be appropriately selected depending on the magnitude of the image signal and the diameter of reading drum 30.

The diameter of reading drum 30, the sampling frequency, and the cutoff frequency of this embodiment are tabulated below.

TABLE

| Film size, drum size | Sampling frequency (KHz) | Cutoff frequency (KHz) |
|---|---|---|
| 35 mm, large drum | 241.1 | 222.2 |
| 35 mm, medium drum | 120.7 | 111.1 |
| 6 × 7 cm, large drum | 105.2 | 111.1 |
| 35 mm, small drum | 60.6 | 55.6 |
| 4 × 5 inch, large durm | 60.3 | 55.6 |
| 6 × 7 cm medium drum | 52.7 | 55.6 |
| 4 × 5 inch, medium drum | 30.2 | 27.8 |
| 8 × 10 inch, large drum | 30.1 | 27.8 |
| 4 × 5 inch, small drum | 15.1 | 13.9 |
| 8 × 10 inch, medium drum | 15.1 | 13.9 |

The data in the above table was collected on the conditions that the number of samplings is 512 in the rotating direction, or main scanning direction, and that the number of turns of the drum 30 is fixed at 1200 turns/min. irrespective of the diameter of the drum. The size (circumferential length) of large drum 30 is 565 mm and its angular speed is 11,300 mm/sec. The size and angular speed of medium drum 30 are 283 mm and 5660 mm/sec. Those of small drum 30 are 142 mm and 2840 mm/sec. The film size, or effective sampling length of the 35 mm film is 24 mm×35 mm; that of the 6×7 cm film, 55 mm×68 mm; that of the 4×5 inch film, 96 mm×122 mm; that of the 8×10 inch film, 192 mm×244 mm.

As described above, if the low-pass filter is used for the averaging circuit 124, and the cutoff frequency is appropriately adjusted, the incorrect sampling is eliminated. Therefore, satisfactory image pick-up and storage can be ensured.

In storing the image signal averaged by averaging circuit 124 into IC memory 142, A/D converter 140 samples the image signal at the sampling frequency shown in the above table so that 512 picture elements (pixels) are generated for each scanning line, and A/D converts and sends them to the IC memory 142 for storage.

IC memory 142 stores 512×512×4 (colors) in 8 bits (256 density steps). In writing and reading out the image data to and from IC memory 142, the image data is stored in synchronism with the scanning for the original 2, under control of address controller 126. Further, the width and height of the image are address controlled as described below. As shown in FIG. 4, addresses are arrayed in a matrix fashion. When the color original 2, as shown in FIG. 2, bearing a picture of a laid down human being is set on the drum 30, the first scanning line is stored with addresses (1, 1), (1, 2), (1, 3) ..., (1, 512), and the second scanning line is then stored with addresses (2, 1), (2, 2), (2, 3), ..., (2, 512). For reading out such addressed data, because the mirror phenomenon exists, the first scanning line stored in the memory and to be displayed on the color monitor screen is read out in the order of (1, 512), (1, 511), (1, 510), ..., (1, 1). The second scanning line is read out in the order of (2, 512), (2, 511), (2, 510), ..., (2, 1). When the image data thus read out is applied to the monitor display, the human being is displayed standing.

If the color original 2 bearing a picture of an standing human being is placed on drum 30, the first scanning line is stored in the order of addresses (1, 512), (2, 512), (3, 512) ..., (512, 512). The second scanning line is stored in the order of (1, 511), (2, 511), (3, 511), ..., and so on. If the image data is read out as described above, the standing human being is displayed. As described, the width and height of the image is controlled when the data is stored in IC memory 142 and the mirror phenomenon is compensated when the data is read out from IC memory 142, thereby the image is correctly displayed on the monitor. When the number of turns of drum 30 is 1200 r.p.m, one image is stored into IC memory 142 for about 26 seconds. The image data is read out from memory 142 at 30 frame/second since it is displayed by the monitor 152. The memory device including IC memory 142 is so designed that the read-out and writing operations can be made simultaneously. Therefore, the image can be displayed by monitor 152, while it is stored into color monitor 152.

The image signal read out from IC memory 142 is subjected to the D/A conversion in the D/A converter 144, and input to the gradation correction circuit 146 as the color calculating circuit. In this example, only the gradation correction circuit 146 is used for the color calculating circuit, and able to make adjustment of compression, highlight, shadow, contrast, pedestal, etc. The input of gradation correction circuit 146 is connected to switch 182. By operating this switch 180, the output of level adjusting circuit 120 is directly supplied to gradation correction circuit 146. The output of gradation correction circuit 146 is connected to switch 184. By this switch, the output of the circuit 146 is selectively supplied to curve correction circuit 147 or lever adjusting circuit 192. The output of level adjusting circuit 192 is applied to color scanner 20, and through switch 186 to A/D converter 60. Level adjusting circuit 192, unlike level adjusting circuit 120, converts the 0.7 Vp-p signal into the TTL level signal.

Curve correction circuit 147 makes the curve correction in order to control the printing conditions in the printing process. For example, (1) the thickness and thinness at the mesh dot change in a curvature manner, due to the inversion of the negative/positive of the film. This circuit 147 corrects this. (2) In the proof printing, the pressure for printing causes ink to spread. Such ink spread is corrected in a curvature manner. (3) In the area where large mesh dots collectively exist, the adjacent mesh dots partially overlay. In such a place, increase of the density is not proportional to the amplitude of the signal. This needs the correction by the correction circuit 147.

Color correction circuit 148 and matrix circuit 150 are for converting the image signals of Y, M, C and BK in the printing system into the picture signals of R, G, and B in the television system. Color correction circuit 148 is used mainly for correcting the nonlinearity due to the overlaying of ink. Matrix circuit 150 is for converting the color amount of ink into that of fluorescent color of the television. The details of such circuit is discussed in U.S. Pat. No. 3,972,066.

The image signals, which have been converted into R, G and B in the television system by this circuit, are input to color monitor 152 for displaying purposes.

The operation of the first embodiment will be described. The operation is comprised of a step for setting color original 2 onto reading drum 30, a step for obtaining color separation signals, a step for simulating a color print based on the color separation signals, a step for adjusting the color separation conditions while observing the simulation image, and a step for actually making color separation films. Also in the simulation, an operator sees color original 2, and temporarily sets desirable color separation conditions in masking circuit 40, UCR circuit 42, and gradation correction circuit 44. At this time, switches 180 and 182 are switched for avoiding the by-passing the circuit. Switch 184 is connected to curve correction circuit 147. Switch 186 is connected to channel selector 52. Switches 180 to 186 are connected to the upper side contacts as viewed in the drawing. Exposure head 66 is off, and hence the color separation film is not subjected to the exposure. Gradation correction circuit 146 is preset to 0. Color original 2 is set to drum 30, and roughly scanned for the simulation by color monitor 152. In the case of the 4×5 inch film, scanner 20 is set at 32% (0.32 times) of magnification. The entire color original 2 is scanned with 512 scanning lines, and stored into IC memory 142. Simultaneously, simulation unit 110 simulates the printing image under the color separation conditions which have been set in masking circuit 40, UCR circuit 42, and gradation correction circuit 44.

If the image on the screen of color monitoring 152 is satisfactory, separation film 6 is set to exposure drum 70, and exposure head 66 is turned on, and original 2 is finely scanned, and the color separation work is executed.

If the image on the screen of color monitor 152 is unsatisfactory, gradation correction circuit 146 is adjusted to change the color separation conditions for the image stored in IC memory 142. The simulation of the final reproduction is continued. It is noted that IC memory 142 and gradation correction circuit 146, which corresponds to gradation correction circuit 44 in the color scanner 20, are provided in the simulation unit 110. With provision of these units, after the image on the color original is scanned and the image data is stored in IC memory 142, the simulation can be continued on the basis of the output of this memory 142, leading to time saving. Although the scanning by color scanner 20 is rough, the time taken for drum 30 to rotate 512 turns is needed for the scanning. This time is long and wasteful.

When an optimum gradation correction is set up, then the color separation work is started. Switches 180, 182, 184, and 186 are turned to the lower side contacts. With this connection, the output signal from channel selector 52 is supplied to A/D converter 60, via level adjusting circuit 120, gradation correction circuit 146, and level adjusting circuit 192. Thus, a signal path is provided in which the output from color scanner 20 is supplied to simulation unit 110, and it is passed through only gradation correction circuit 146 and is returned to color scanner 20. The provision of this signal path eliminates the resetting work of the color separation conditions, which have been adjusted by simulation unit 110, for the color scanner 20, and therefore eliminates occurrence of mistaken operation. If the setting conditions of the circuits, particularly masking circuit 40, other than masking circuit 40, are unsatisfactory, adjustment for the masking circuit 40 is performed and then the simulation is made again to check the setting conditions, and the color separation work is executed.

Apparatus can save more time and cost than the previewing apparatus of U.S. Pat. No. 3,972,066 in which the proof printing film is checked. Further, since the output signal from the color calculating circuit including the masking circuit, the UCR circuit, and the like, which is contained in the color scanner, is used, this simulation apparatus can also be used as a proof printing condition setting apparatus. The large part of this simulation apparatus is common with that of the color scanner actually used for printing. Therefore, an exact simulation is expected, and further the cost of the apparatus to manufacture is lower than that of the apparatus using a TV camera for image pickup.

One frame image is stored into the IC memory, through the averaging circuit containing, for example, the low-pass filter which is designed on the basis of at least the size of the color original and the diameter of the exposure drum. This feature eliminates the incorrect sampling in which the density offset from the average density is sampled.

Additionally, for the color separation work, the color separation film is exposed through gradation correction circuit 146 of simulation unit 110. With this feature, there is no need for applying the correction conditions once obtained to gradation correction circuit 44 in scanner 20, which is needed for the conventional separate type simulation apparatus. In this respect, the workability is remarkably improved.

As described above, there is provided a scanner set-up simulation apparatus capable of simulating the final reproduction (printed matter) printed matter with little modification of color scanner 20, except switch 186.

Since the signals from the color scanner is those after color calculated, the proof operation can be executed without actually making a color separation films.

A second embodiment of the present invention will now be described. The second embodiment relates to the level adjusting circuit 120. FIG. 5 shows a circuit diagram of level adjusting circuit 120. Image signals for the color components Y, M, C and BK, which are output from channel selector 52, are respectively input to level adjusting circuits 120-Y, 120-M, 120-C and 120-BK for the corresponding color components. These level adjusting circuits 120-Y, 120-M, 120-C and 120-BK have the same circuit configurations. Therefore, only level adjusting circuit 120-BK is typically illustrated in details, while other level adjusting circuits 120-M, 120-C and 120-Y are shown as blocks.

The BK image signal is supplied to matching circuit 172, where the black level and white level of the image signal are adjusted. By the adjustment, the TTL signal is converted into a signal of 0.7 Vp-p. The output of matching circuit 172 is supplied to averaging circuit 124 through switch 180. The output of matching circuit 172 is also supplied to the input terminals of line memories 176 and 178 via A/D converter 174. Line memories 176 and 178 have each a memory capacity enough to store the image signal data representative of the largest color original 2 that is produced during one turn of drum 30.

The output terminals of line memories 176 and 178 are respectively connected to the first and the second input terminals of selector 180. The output of selector 180 is the output of level adjusting circuit 120-BK.

The start pulse from control circuit 12 is supplied to write clock generator 182. Write clock pulse is set to such a frequency as to allow the color component signals supplied from color scanner 20 to be written into line memories 176 and 178 without changing their transfer rates. Therefore, the clock frequency is variable depending on the size of color original 2.

The output clock pulse of write clock generator 182 is supplied to the clock terminals of A/D converters 174 of level adjusting circuits 120-Y, 120-M, 120-C and 120-BK. The output of write clock generator 182 is also supplied to write address generator 188.

The output of write address generator 188 is also supplied to the first input terminals of selectors 190 and 192. The output of address generator 188 is supplied to switch actuator 194.

Switch actuator 194 generates a signal, selectively from either the first or the second output terminal. The first output from the first output terminal controls selectors 184 and 190. The second output from the second output signal controls selector 186 and 192, and selectors 180 of level adjusting circuit 120-Y, 120-M, 120-C and 120BK. The first and second outputs of switch actuator 194 further control the read and write operation for line memories 176 and 178 of level adjusting circuit 120-Y, 120M, 120-C and 120-BK. Line memories 176 and 178 are controlled so that, when one of the memories is in a write mode, the other memory is in a read mode.

The output clock pulse of read clock generator 196 is supplied to the second input terminals of selectors 184 and 186. The frequency of the read clock pulse is higher than that of the write clock pulse, and is set to the frequency corresponding to the sweep frequency of oscilloscope 160, 10 MHz, for example. The output of read clock generator 196 is also supplied to read address generator 198. The output of read address generator 198 is supplied to the second input terminals of selectors 190 and 192.

The outputs of selectors 184 and 190 are supplied to line memories 176 of level adjusting circuits 120-Y, 120-M, 120-C and 120-BK. The outputs of selectors 186 and 192 are supplied to line memories 178 of level adjusting circuits.

The outputs of level adjusting circuits 120-Y, 120-M, 120-C and 120-BK (the outputs of selector 180) are respectively connected to the first to fourth input terminals of selector 200. The output of selector 200 is supplied to oscilloscope 160 via D/A converter 202. Selector 200 is controlled by ¼ counter 204 which counts the output of read address generator 198. The first output of those four outputs of ¼ counter 204 is supplied to the sweep circuit of oscilloscope 160. The output of read clock generator 196 is supplied to the clock terminal of D/A converter 202.

The level adjusting operation of this level adjusting circuit 120 will be described. A gray scale is set onto the drum 30 of color scanner 20, in align with the color separation start point of color original 2. Exposure head 32 is positioned at the top of the gray scale. Drum 30 is rotated at a predetermined speed, e.g. 20 turns/sec. At this time, the image signals of the respective color components as obtained are level adjusted by matching circuit 172, and supplied to A/D converter 174. A/D converter 174 does not start its operation until a start pulse is generated, and a write pulse is generated from clock generator 182. The converter 174 samples the image signal in response to the clock pulse, and converts each sampling pulse into digital data of 8 bits. Since the frequency of the write clock pulse is variable depending on the size of the original, A/D converter 174 generates 512 data for each line.

In response to the start pulse generated once for every turn of drum 30, write clock generator 182 generates clock pulses during a predetermined time duration (required for the image signal which represents one line to be written into line memories 176 and 178). When write clock pulses are generated, the output addresses of write address generator 188 successively changes. Responsive of the write address, switch actuator 194 generates the first output, and sets selectors 184, 186, 190 and 192 to the positions as shown. Then, the write clock and the write address are supplied to line memory 176, respectively via selectors 184 and 190. The output of A/D converter 174 is then written into line memory 176. At this time, the read clock and the read address are supplied to line memory 178, respectively via selectors 186 and 192. The data of line memory 178 is read out at a rate higher than that in the write mode, with the time axis compressed. The data of line memory 178 is repeatedly read out during the time period when the data of one line is written into line memory 176.

When a write address is generated in response to the next start pulse generated, switch actuator 194 generates a second output, and selectors 184, 186, 190 and 192 are set to the positions opposite to those as illustrated. By the setting, line memory 176 is set in the read mode, while memory 178 is set in the write mode. In this way, for each turn of drum 30, a gray scale signal of one line is alternatively written into line memories 176 and 178. From the line memory that is not in the write mode, the stored data is repeatedly read out, with its time axis compressed.

Selector 180 selects the output of the line memory that is in the read mode, because selector 180 is controlled by the second output of switch controller 194.

Figure 6:
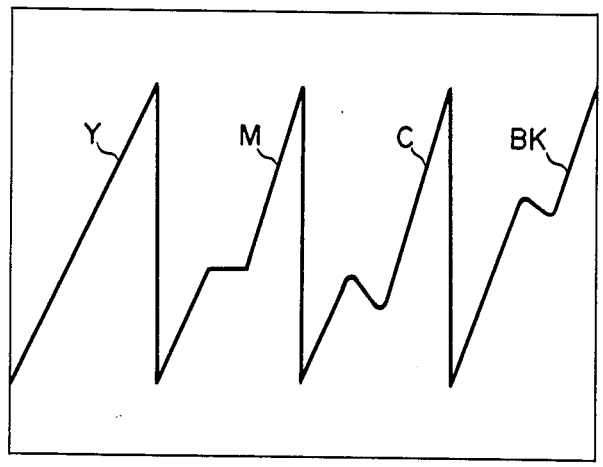
FIG. 6 shows a waveform displayed on the oscilloscope of the second embodiment.
Figure 2B:
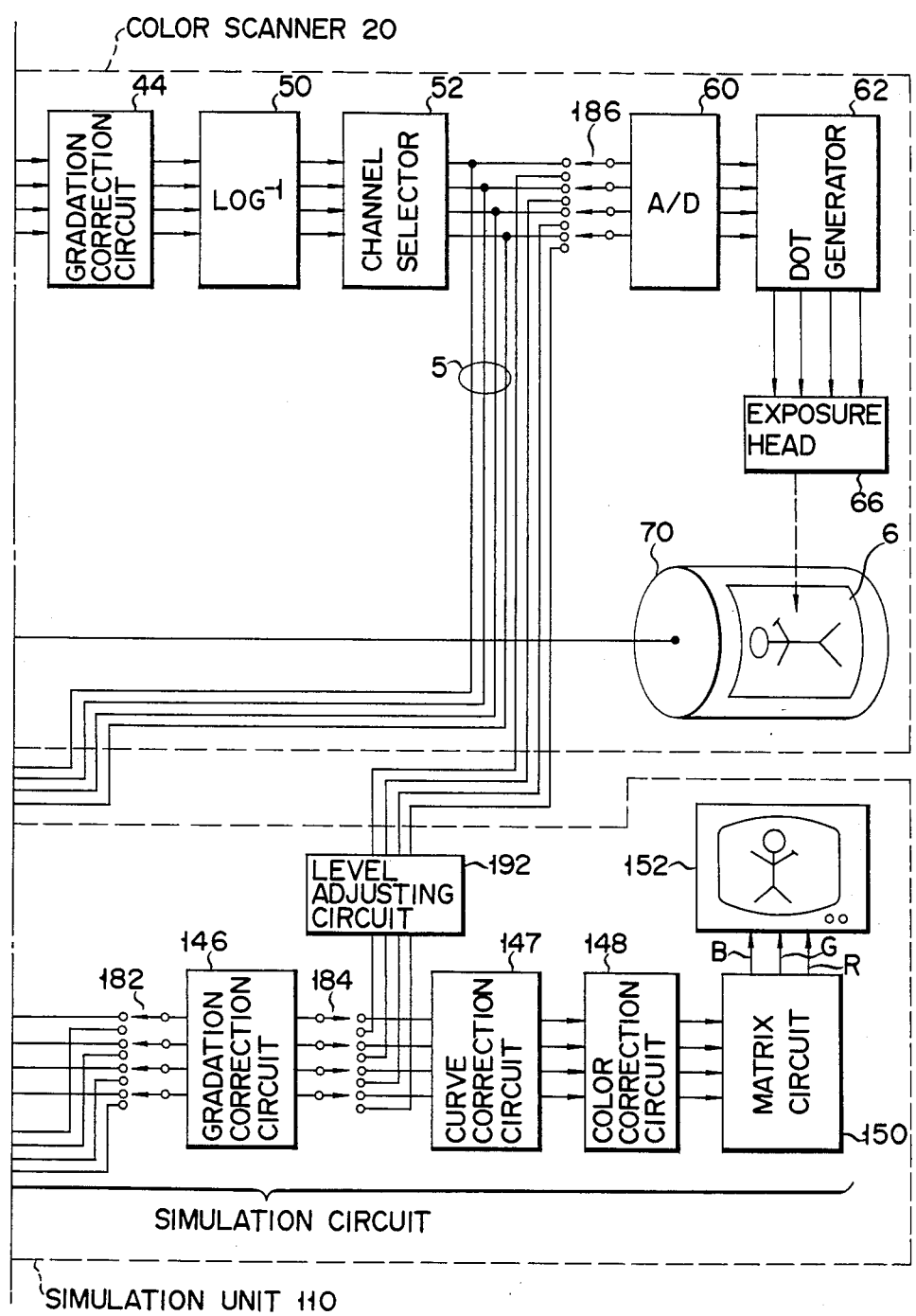

The outputs of level adjusting circuits 120-Y, 120-M, 120-C and 120-BK are input to selector 200. Each time read address of one line is generated, read address generator 198 outputs a pulse to ¼ counter 204. Each time receiving the pulse, ¼ counter 204 sequentially generates output signals at the first to fourth output terminals in this order, and changes the connection of selector 200 in a successive way. As a result, the gray scale signals of color components Y, M, C and BK are read out line by line from selector 200. The read out signals are supplied through D/A converter 202 to oscilloscope 160. The first output of ¼ counter 204 is supplied as a trigger signal. Oscilloscope 160 displays a waveform, which is formed by composing the gray scale signals of color components Y, M, C and BK, as shown in FIG. 6. This feature allows the user to observe the four color components at one glance, thereby making easy the level adjustment by matching circuit 172. Since the waveform that is displayed on oscilloscope 160 is that of a signal as adjusted by matching circuit 172, the adjustment result can be seen instantaneously, thereby increasing the workability.

As described above, in the second embodiment, the time axis of a signal at a long repetitive period such as the signals from the color scanner is compressed, before the signal is supplied to the oscilloscope. Therefore, the levels of the color component signals output from the color scanner can be observed on the oscilloscope. The level matching of the color scanner with the simulation unit is made easy, greatly enhancing the workability.

FIG. 7 shows a third embodiment of the invention. Like the second embodiment, the third embodiment relates to level adjusting circuit 120. The same portions as those in the second embodiment are represented by the same reference numerals. In the second embodiment, the outputs of level adjusting circuits 120-Y, 120-M, 120-C and 120-BK are supplied by a single signal line via selector 200 to D/A converter 202 and oscilloscope 160. In the third embodiment, D/A converters 202 are respectively provided in level adjusting circuits 120-Y, 120-M, 120-C and 120-BK. The outputs of level adjusting circuits are separately supplied to oscilloscope 160.

In the third embodiment, by switching in the probe, the gray scale signal waveforms of the respective color components are sequentially displayed on oscilloscope 160. In the second and third embodiments, A/D converters 174 and 140 are both used. If necessary, A/D converter 174 may be omitted. In this case, the output of matching circuit 172 is supplied to A/D converter 140. The output of A/D converter 140 is written into line memories 176 and 178. A clock signal from write clock generator 182 is supplied to A/D converter 140. In the above embodiments, for the scanning of the color original, the original is mounted on a rotary drum and the drum is rotated. As an alternative, a relation motion of a line sensor and the original may be used for the same purposes, as in a facsimile, for example.

A fourth embodiment of the invention will be described. The embodiment eliminates use of the interpolation used when the image is read out for display the rotated image, as illustrated in FIGS. 1A to 1D. FIG. 8 shows a block diagram of the fourth embodiment. The color scanner 20 is connected to simulation unit 110 which includes a memory and a signal processing circuit. Color scanner 20 optically scans a color original, separates the scanned image signals into four color component signals, and exposes a monochrome film on the basis of the color components signals, to make color separation films. The image signals of respective color components are supplied to simulation unit 110.

The output of sampling pulse generator 210 is supplied via selector 212 to color scanner 20 and address controller 126. A switch (not shown) is connected to selector 212. In response to the signal from the switch, the frequency of the output pulse of sampling pulse generator 210 is selected. The output of selector 212 controls the supply of the image signals to simulation unit 110, that is to say, the write operation of the image signal to the memory.

The output of timing pulse generator 214 is supplied to simulation unit 110. The supply of the image signals from simulation unit 110 to color monitor 152, that is, the reading out operation of the image data from the memory is controlled by the time signal from the timing pulse generator.

The operation of the above-mentioned embodiment will be described. A color original is set on the drum 30 of color scanner 20, and then the drum is rotated. When the rotating speed of the drum reaches a fixed speed, color scanner 20 moves reading head 32 and starts the color separation work. The orientation of the display image (its original orientation or its orientation when it is turned or rotated by 90°), and the size of the original are preset by the switch in selector 212.

Figure 1A:
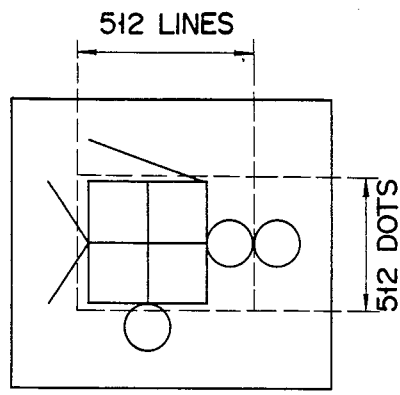
FIGS. 1A, 1B, 1C, and 1D diagrammatically show the writing/reading operation of the memory in the prior scanner set-up simulation apparatus.
Figure 1B:
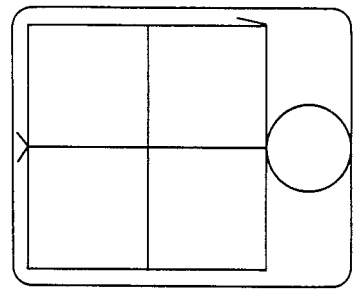
Figure 1C:
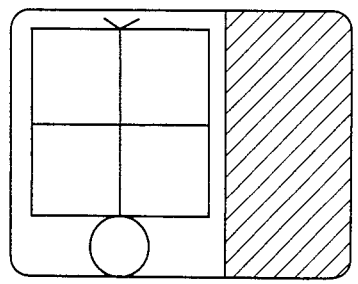
Figure 1D:
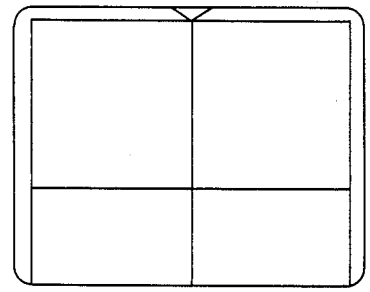

The operation of the simulation apparatus when the image is displayed with the orientation when it is scanned, is the same as that of the conventional apparatus shown in FIGS. 1A and 1B.

The operation of the apparatus when the original is rotated by 90° from its original orientation, will be described referring to FIGS. 9A and 9B. In this case, the scanned portion of the original is not the original portion at 3:4 of the height-to-width ratio (FIG. 1A), but that at 4:3 (FIG. 9A), so that the height-to width ratio of the 90° rotated image corresponds to that of the image on the color monitor screen. Here, the sampling pitch in the height direction is equal to that in FIG. 1A.

In this way, if the scanned image is written into the memory, and read out of the memory as it is, the original as first laid sideways is turned by 90°, and it is displayed turned downwardly on the screen of color monitor 152.

As described above, according to this embodiment, when the image is displayed turned, the original portion whose the height-to-width ratio is 4:3 is scanned so that that ratio after the image is turned is equal to that of the image on the monitor screen, and the turned image is stored into the memory. Therefore, the whole scanned image can be displayed turned without any interpolation.

A specific example will be given in which the color separation area at the height-to-width ratio of 3:4 as enclosed by a broken line shown in FIG. 1 is 6 inches for height, and 8 inches for width. With 512×512 of the number of pixels of the memory, if the image is written into the memory while not turned, the horizontal pixel pitch (shift pitch of the scanning line) is 8/512 inches, and the vertical pixel pitch (corresponds to the period of the pulse for sampling each scanning line signal) is 6/512 inches.

When it is rotated by 90° and written into the memory, the vertical pixel pitch is 6/512 inches and equal to that of the above case, but the horizontal pixel pitch is (8/512)×(¾)². This change of the pixel pitch is made by controlling the feed pitch of the reading head of the scanner by an image turn signal applied through the switch (not shown) connected to selector 212.

As described above, according to this embodiment, there is provided a useful image write/read system. In this system, in writing the image into the memory, the image is turned its orientation by the control signal externally applied. The image is read out in a normal manner, and displayed turned by 90°. The whole scanned image as turned can be displayed without any interpolation.

While in the above-mentioned embodiment, the size of the original is 6×8 inches, and the height-to-width ratio of the monitor image is 3:4, it is evident that this invention is applicable for other sizes of the original and other ratios of the monitor image. In the above-mentioned embodiment, for scanning the original, the original is placed on the drum and the drum is rotated. Alternatively, the scanning, using a line sensor, is made by a relative motion of the original and the line sensor.

Figure 10:
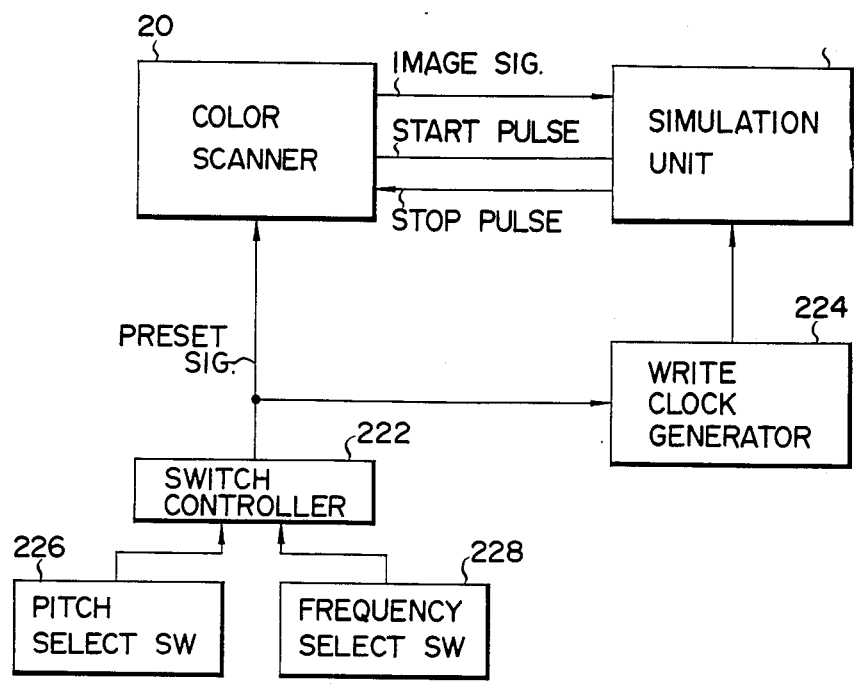
FIG. 10 is a block diagram illustrating a fifth embodiment of a scanner set-up simulation apparatus according to this invention.

FIG. 10 shows a block diagram of a fifth embodiment pertaining to the operation for writing the scanner output signal into the IC memory 142 in simulation unit 110, without thinning out the scanner output signal. Color scanner 20 supplies the image signals of respective color components and a start pulse, to simulation unit 110. The start pulse is generated every time the drum is rotated and the original is turned till its top (color separation work start point) reaches the head position. A stop pulse is supplied from simulation unit 110 to color scanner 20. The stop pulse is generated when simulation unit 110 completes the fetching of a predetermined number of scanning lines signals. This pulse stops the operation of color scanner 20.

A preset signal representing the original size is directly supplied from switch controller 222 to color scanner 20. The same is also applied via write clock generator 224 to simulation unit 110. Switch controller 222 is connected to various types of setting switches 226 and 228.

The operation of this embodiment will be described. An original is set around the drum of color scanner 20, and the drum is turned. When the speed of the rotating drum reaches a predetermined speed, the color scanner moves the head and starts the color separation work. To make an actual color separation plate, the head shift pitch is set at 1/150 inches. In conducting the printing simulation, the head shift pitch is varied according to the size of the original in the following manner. When the color separation start point of the original reaches the head position, the start signal is sent to simulation unit 110. In response to the start signal, the simulation unit 110 starts the writing of the output image signals derived from color scanner 20 into the memory.

The shift pitch of the head, which depends on orientation of the original (vertical and horizontal), the size of the document, and the size of the drum, and the write clock frequency are preset by means of switches 226 and 228 in switch controller 222. When the diameter of the reading drum head used differs, an apparent size of the original also differs because the number of turns of the drum is fixed. In this case, therefore, the sampling frequency must be changed. Switch controller 222 sets such a value of a preset signal that the number of pixels of the image signal to be loaded into simulation unit 10 is fixed at a predetermined value. e.g., 512×512, irrespective of the size of the original.

The number of pixels arrayed in the horizontal direction (the circumferential direction of the drum) of the color monitor image can be obtained by controlling the sampling frequency for writing the signal of each scanning line into the memory. The sampling frequency is equal to that of the output pulse of write clock generator 224, and is set at a value obtained by dividing the original size by 512. The original size represented by the preset signal, is equal to the length of the original in the circumferential direction of the drum.

The number of pixels of the color monitor image in the vertical direction is determined by the shift pitch of the reading head of color scanner 20. For this reason, in this embodiment, the shift pitch of the head is set to a value obtained by dividing the original size by 512. In this case, the original size corresponds to the length of the original in the axial direction of the drum.

Accordingly, the number of pixels of the image signal, which is to be written from color scanner 20 into the simulation unit 110, is set at a predetermined value, e.g. 512×512, irrespective of the size of the original. When the head of color scanner 20 is shifted 512 times, all of data have been written into the memory. At this time, simulation unit 110 issues a stop signal to stop the operation of color scanner 20.

The image signals of respective color components as have been loaded into simulation unit 110, are composed into an image of printed matter by the color monitor. An operator checks the color separation conditions, using this simulation of the printed matter.

Figure 11:
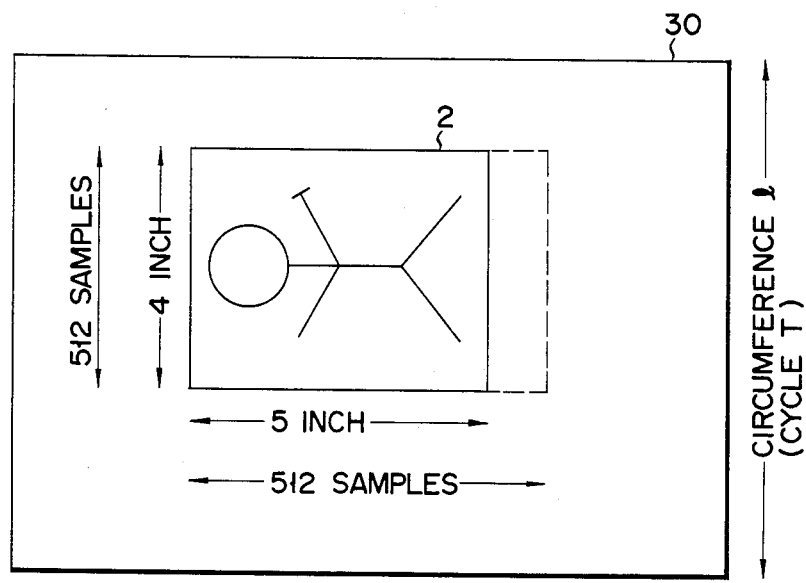
FIG. 11 diagrammatically shows the relationship between the drum of the scanner and the color original wound on the drum in the fifth embodiment.

FIG. 11 shows the surface of the drum of the color scanner when it is developed into a plane, and digrammatically illustrates the relationship between drum 30 and original 2 on the drum surface. The illustration is for the case that the original 2 of 4×5 inches is displayed on the monitor screen with the aspect ratio of 3:4 in the NTSC television system.

In the case of the drum rotating peroid T of 50 ms and the drum periphery length "l" of 283 mm, the frequency of the clock signal for writing the image information of the original of 4 inches (approximately 101.6 mm) long in the circumferential direction is approximately 26.85 kHz (=283×101.6×512×20), for 512 samplings.

As for the drum feed pitch, since the aspect ratio of the monitor is 3:4, it is only needed that the original is scanned over the length ¾ times of 4-inch in the circumferential direction, by 512 scanning lines. The feed pitch of the drum of the color scanner is 96 lines/inch. Accordingly, the reading head is fed 5 inches or more, as indicated by a broken line 11.

The image thus set in the memory is read out in such a way that the axial direction of the drum coincides with the horizontal direction of the monitor, and the circumferential direction of the drum coincides with the vertical direction of the drum. The image as read out has the same aspect ratio as the monitor.

As seen from the foregoing description, in this invention, the shift pitch of the reading head of color scanner 1 is varied according to the original size (in the axial direction of the drum). The sampling frequency for writing scanning lines of the image signals into the memory is varied according to the original size (in the circumferential direction of the drum). The number of pixels of the image signals supplied from color scanner 20 to simulation unit 110 is set to a preset value irrespective of the size of the original.

With this, a signal is supplied from the simulation unit to the color scanner according to the original size, which the signal determines the head feed pitch to make the number of scanning lines of the scanner equal to that of the color monitor. The result is that only the image information used for the simulation is effectively scanned, and therefore time to thin out the unnecessary scanning line signals is saved. Further, there is no need for the complicated circuitry including the line counter for thinning the scanning line of data, and its control circuit.

In the embodiment as mentioned above, the size of the original is 4×5 inches, and the aspect ratio of the monitor screen is 3:4. It is evident, however, that these are not limited to such figures. This is true for the image data write for enlargement of image size, and the image data read out for rotation of image orientation. In the abovementioned embodiment, for scanning the original, the original is set onto the drum and the drum is rotated. Alternatively, a relative motion of the original and the line sensor may be used for the same purposes.

Turning now to FIG. 12, there is shown a block diagram of a sixth embodiment of this invention. This embodiment is capable of rotating the image without any designation of angle at the time of reading out and writing the image data to and from the memory, by using a read out mode selector.

It is assumed now that four write modes are provided, normal, 90°, 180°, and 270° mode. In write mode controller 232, these modes are coded; "00" for normal, 01" for 90°, "10" for 180°, and "11" for 270°. In the normal write mode, "00", together with the image data, is written into the related memory location of the memory 142. In the 90° write mode, "01", together with the image data, is written into the related memory location. In the read out mode, the data is read out of the memory location into which the write mode is first loaded by read mode controller 234. The read address corresponding to the write mode is set up using the write mode code, under control of read mode controller 234. By this procedure, the rotated image can be displayed by color monitoring 152 in the mode as specified in writing the image data.

While in the above example, one memory and four write modes are used, this embodiment is applicable for the case using a plurality of memories and more than four modes. Also in the latter case, in writing the image data, the codes of the write modes are written into the related memory locations, and the image can be displayed in the write mode as specified in the data writing.

As seen, in the above embodiment, the image can be displayed without designating again the write mode as has been specified in writing the image data, such as the normal mode and the rotation mode. Accordingly, it becomes unnecessary to use the read mode selector.

What is claimed is:

1. A scanner set-up simulation system comprising:
   color scanner means for color-separating a color original for printing; and
   simulation unit means, connected to said color scanner means, for simulating and displaying a color print reproduction,
   said color scanner means comprising:
      reading means for reading an image information of a color original and for producing color separation signals;
      first correcting means for correcting a color-separation condition of the color separation signals, said condition including at least gradation; and
      means for exposing color separation films based on the corrected color separation signals output from said first correcting means, and
   said simulation unit means comprising:
      means for receiving the color separation signals from said correcting means;
      means for storing the received color separation signals;
      second correcting means for correcting a color-separation condition of the color separation signals read out from said storing means, said condition including at least gradation; and
      means for simulating and displaying a color print reproduction based on the corrected color separation signals from said second correcting means.

2. An apparatus according to claim 1, wherein said simulation unit means further comprises means for by-passing said storing means thereby the received color separation signals are directly supplied to said correcting means and means for supplying the corrected color separation signals output from said second correcting means to the color separation film exposing section of said color scanner.

3. An apparatus according to claim 1, wherein said simulation unit means further comprises means, connected between said receiving means and said storing means, for averaging said received color separation signals, an averaging process being in accordance with a size of said color original and a diameter of a reading drum of said color scanner means to which the color original is wound.

4. An apparatus according to claim 3, wherein said averaging means comprises a low-pass filter whose cut-off frequency is determined in accordance with the size of said color original and the diameter of the reading drum and means for sampling an output signal of said low-pass filter, a sampling frequency of said sampling means being determined in accordance with the size of said color original and the diameter of the reading drum.

5. An apparatus according to claim 1, wherein said receiving means comprises means for adjusting a white level and a black level of said color separation signals from said color scanner.

6. An apparatus according to claim 5, wherein said receiving means comprises an oscilloscope for monitoring the white level and the black level of said color separation signals and means, connected between said adjusting means and said oscilloscope, for increasing a repetition rate of said color separation signals.

7. An apparatus according to claim 1, wherein said storing means comprises:
   memory means for storing the color separation signals of one frame; and
   address controller means for controlling a write address and a read address of said memory means according to a rotation mode, thereby the simulated color print reproduction is displayed in a rotated manner.

8. An apparatus according to claim 1, wherein said color scanner means further comprises a rotating drum on which the color original is wound and a photoelectric head for shifting a predetermined pitch in an axial direction of said rotating drum for each rotation of said rotating drum, the pitch being determined by a size and an aspect ratio of said color original and a rotation mode representing whether or not said simulated printed reproduction is displayed with an inverted aspect ratio.

9. An apparatus according to claim 1, wherein said color scanner means further comprises a calibration circuit connected to said reading means, a masking circuit connected to said calibration circuit, and an under color removal circuit connected to said masking circuit, an output signal from said under color removal circuit being supplied to said first correcting means.

10. A scanner set-up simulation apparatus, which is connected to a color scanner for color-separating a color original for a color printing, for producing color separation signals, and for forming color separation films based on the color separation signals, further comprising: means for receiving the color separation signals from the color scanner; means for storing the received color separation signals; means for correcting a color-separation condition of the color separation signals read out from said storing means, said condition including at least gradation; means for simulating and displaying a color print reproduction based on the corrected color separation signals; means for by-passing said storing means thereby the received color separation signals are directly supplied to said correcting means and means for supplying the corrected color separation signals to a color separation film exposing section of said color scanner.

11. A scanner set-up simulation apparatus, which is connected to a color scanner for color-separating a color original for a color printing, for producing color separation signals, and for forming color separation films based on the color separation signals, further comprising: means for receiving the color separation signals from the color scanner; means for storing the received color separation signals; means for correcting a color-separation condition of the color separation signals read out from said storing means, said condition including at least gradation; means for simulating and displaying a color print reproduction based on the corrected color separation signals; and means, connected between said receiving means and said storing means, for averaging said received color separation signals, an averaging process being in accordance with a size of said color original and a diameter of a reading drum of said color scanner to which the color original is wound.

12. An apparatus according to claim 11, wherein said averaging means comprises a low-pass filter whose cut-off frequency is determined in accordance with the size of said color original and the diameter of the reading drum and means for sampling an output signal of said low-pass filter, a sampling frequency of said sampling means being determined in accordance with the size of said color original and the diameter of the reading drum.

13. A scanner set-up simulation apparatus, which is connected to a color scanner for color-separating a color original for a color printing, for producing color separation signals, and for forming color separation films based on the color separation signals, further comprising: means for receiving the color separation signals from the color scanner comprising a means for adjusting a white level and a black level of said color separation signals from said color scanner, an oscilloscope for monitoring the white level and the black level of said color separation signals and means, connected between said adjusting means and said oscilloscope, for increasing a repetition rate of said color separation signals; means for storing the received color separation signals; means for correcting a color-separation condition of the color separation signals read out from said storing means, said condition including at least gradation; and means for simulating and displaying a color print reproduction based on the corrected color separation signals.

* * * * *